United States Patent [19]
Grundy et al.

[11] 3,969,654
[45] July 13, 1976

[54] PROPULSION TRAIN LINE ENCODER FOR A TRAIN SPEED REGULATION SYSTEM

[75] Inventors: Reed H. Grundy, Murrysville; Joseph J. Pierro, Pittsburgh, both of Pa.

[73] Assignee: Westinghouse Air Brake Company, Swissvale, Pa.

[22] Filed: May 27, 1975

[21] Appl. No.: 581,224

[52] U.S. Cl. .................................. 317/5; 105/61; 246/182 R; 246/187 R
[51] Int. Cl.² ......................................... H02P 7/00
[58] Field of Search ..................... 317/5; 104/152; 246/182 R, 182 B, 182 C, 187 R; 105/61; 235/92 EV, 150.2; 328/44, 62, 75

[56] References Cited
UNITED STATES PATENTS

| | | | |
|---|---|---|---|
| 3,206,665 | 9/1965 | Burlingham | 328/44 X |
| 3,334,224 | 8/1967 | Allen et al. | 246/182 B |
| 3,891,046 | 6/1975 | Oicles | 317/5 |

FOREIGN PATENTS OR APPLICATIONS

| | | | |
|---|---|---|---|
| 863,824 | 3/1961 | United Kingdom | 317/5 |

*Primary Examiner*—Harry Moose
*Attorney, Agent, or Firm*—A. G. Williamson, Jr.; R. W. McIntire, Jr.

[57] ABSTRACT

A reversible binary counter unit receives periodic clock pulses from associated advance train line apparatus, one pulse at the end of each cycle of operation of the ATL apparatus to vary train propulsion level in car by car steps. The counter adds or subtracts each pulse in accord with the condition of an up/down direction signal representing the sign of the train speed error. The BCD output of the counter is converted into decimal form and applied to a "select and/or" logic network which energizes the train line relay corresponding to the base propulsion level designated by the decimal count and all lower level train line relays. When the counter reaches either count limit, under a corresponding direction signal, further counting operation is inhibited through a logic network. The inhibit network also compares the existing propulsion level with a table of maximum propulsion levels selected for each range of allowed speeds and inhibits any increase beyond the preselected limit, thus enforcing the propulsion limits. The PTL apparatus also transmits a saturation signal to inhibit operation of the ATL apparatus when a propulsion level limit or maximum level is encoded.

5 Claims, 2 Drawing Figures

PROPULSION TRAIN LINE ENCODER FOR A TRAIN SPEED REGULATION SYSTEM

BACKGROUND OF THE INVENTION

Our invention pertains to an encoder for propulsion train line apparatus for use in a train speed regulation system. More specifically, the invention pertains to an encoding arrangement which receives and encodes propulsion commands to energize the proper combination of control relays to achieve a desired speed level for a train or to activate a train braking function if the propulsion level is reduced below zero.

In the prior art technology in rapid transit train operation, use is made of a parallel-series tractive effort control system. In this arrangement, the four propulsion motors and associated control resistors on each car are initially connected in series across the power source in what is known as the "switch" condition. To increase the power and thus the speed, the resistance is cut out in selective steps and then the motor fields are weakened. To further increase the tractive effort, the motors are switched into a parallel-series combination, normally with two pairs of paralleled motors connected in series, together with the resistors, across the source of power. Once again, further speed increase is obtained by cutting out the resistors in steps and thereafter weakening the fields of the motors. Obviously, except for a complete shut-off of the motors, train speed is reduced by the reverse order of these stepping actions. Originally, and still in use in some older rapid transit systems, the motorman or operator of each train manually controls the train speed from a single position in the lead car using switching contactor apparatus. Each car is controlled simultaneously to the same propulsion condition through train line wires running the length of the train and automatically connected from car to car when such cars are coupled together to form a single train. Subsequently, a variable control of propulsion effort was developed in which variations of the propulsion level exist throughout the train. In other words, the levels of propulsion effort on each car may be independent of the levels obtained or existing on other cars. For example, the control arrangement may be such as to cut out the propulsion effort altogether on every other car in order to provide additional variation or steps in the propulsion level. More sophisticated variable control systems are now being requested. In one, each car of the train may be individually advanced or retarded to the next higher or lower propulsion effort, respectively, than that established by the propulsion train line arrangement. Such changes in the propulsion effort will be stepped car by car from the lead car to the last car of the train under the control of so-called advance train line apparatus over a separate train line channel. For example, one such arrangement is disclosed in the copending application for Letters Patent of the United States, having the same assignee and filed the same date as this present case by R. H. Grundy for an Advance Train Line Register For A Train Speed Regulation System, Ser. No. 581,370. In this type of variable speed control, the propulsion train line apparatus must then respond to the completion of each full train step by step variation cycle and encode these advance train line cycles into a base condition of the propulsion train line apparatus to reflect the new propulsion level of the entire train.

Accordingly, an object of our invention is an improved propulsion train line control apparatus for trains which is responsive to the achievement of preselected conditions in the variable propulsion levels within the train cars to establish a new propulsion level base for future variations.

A further object of the invention is a propulsion train line encoder responsive to the completion of a cycle of car by car changes in the propulsion condition of the train to establish a new train base propulsion level.

Another object of our invention is a propulsion train line arrangement for a rapid transit train which receives and decodes periodic input signals marking the completion of step by step variation cycles in the propulsion level and which encodes a signal to the propulsion train lines to establish a preselected propulsion level equivalent to that achieved during the last completed cycle.

A still further object of our invention is an encoder arrangement for propulsion train line control apparatus which receives input signals designating completion of each cycle of car by car variations in propulsion level, records the number of cycles completed, and changes the existing base propulsion level at the end of each cycle.

Yet another object of the invention is propulsion train line apparatus for rapid transit trains normally responsive to completion of each cycle of car by car variation in the train propulsion level to advance the base propulsion level for the train and which is responsive to a preselected tabulation of train propulsion limitations in accordance with the allowed speed signal to limit the train speed and to transmit a signal to the advance train line register to inhibit further cycles of operation.

A still further object of the invention is propulsion train line apparatus for a rapid transit train responsive to stepped variations in train propulsion level to periodically reset the base propulsion level for further variations and to the detection of the lowest speed rate to actuate a braking control apparatus to initiate brake action and to inhibit advance train line apparatus from attempting a subsequent down count.

Still another object of our invention is propulsion train line encoder apparatus for trains including a reversible counter to register advance train line clock pulses, counting up or down in accord with the direction of speed error, driver means to actuate the train line channels to condition the propulsion apparatus on each car to establish a new train base propulsion level, converter logic to translate the BCD counter output to a decimal signal for the driver means, and inhibit logic to halt counter operation when the maximum limit is reached in converter logic output.

Other objects, features, and advantages of our invention will become apparent from the following description and accompanying drawings when taken in connection with the appended claims.

SUMMARY OF THE INVENTION

The function of the propulsion train line encoder of our invention is to receive the clock pulse that occurs whenever the advance train line apparatus resets and to count either up or down one count, resulting in the energization of one more or one less of the propulsion train line relays. Another function of the apparatus is to limit the maximum allowable propulsion or tractive effort to that required by a tabulation of propulsion effort limitations preselected in accordance with the various allowable speed limits. When such a traction effort limit applies, further count increase by the propulsion train line register is inhibited and a signal is supplied to the associated advance train line register to also inhibit its further operation when it reaches a predetermined condition. Another function of the propulsion train line encoder arrangement is achieved by detecting the lowest state of the counter or register so that, when this state exists along with a countdown command, a signal is generated which enables associated velocity brake error apparatus to call for braking action. The clock pulses from the associated advance train line register and logic apparatus are counted by the propulsion train line register which increases or decreases its count in accordance with an up/down signal, from the velocity brake error control apparatus, which designates direction of speed error. This count, in binary coded decimal (BCD) form, is converted or decoded into decimal form which is then applied to a train line logic network which provides accumulative output from the lowest level to the highest level of the decoded decimal number. The output of the train line logic network is supplied to relay drivers which energize the train line relays in a corresponding pattern to establish an existing train propulsion base level. A separate logic network detects the zero and full count conditions of the register/counter and generates a signal to inhibit further counting action beyond these minimum and maximum limits of the counter capacity.

Still another logic network receives, as inputs to a bank of AND gates, signals representing allowed train speed from a manual speed selector or from an automatic speed control system. The existing output from the train line logic element (to the relay drivers) is also applied to this bank of AND gates at selected levels together with a speed increase demand, i.e., a count-up signal. The logic network input, of course, represents the position of the propulsion train line (PTL) counter. Thus, during an up-count, when the position of the PTL counter corresponds to the allowable train speed, the corresponding AND gate passes the signal. The logic network functions to produce an inhibit signal for application to the PTL counter to halt further increase in propulsion level. An equivalent signal is also transmitted to the advance train line (ATL) apparatus to inhibit further advance of the train propulsion level on the step by step basis. In this manner, specific limitations in the propulsion level under preselected allowed speed conditions are enforced.

BRIEF DESCRIPTION OF THE DRAWINGS

We shall now describe a specific propulsion train line encoder embodying our invention and then point out its novelty in the appended claims. Reference will be made to the accompanying drawings in which:

Figure 1A:
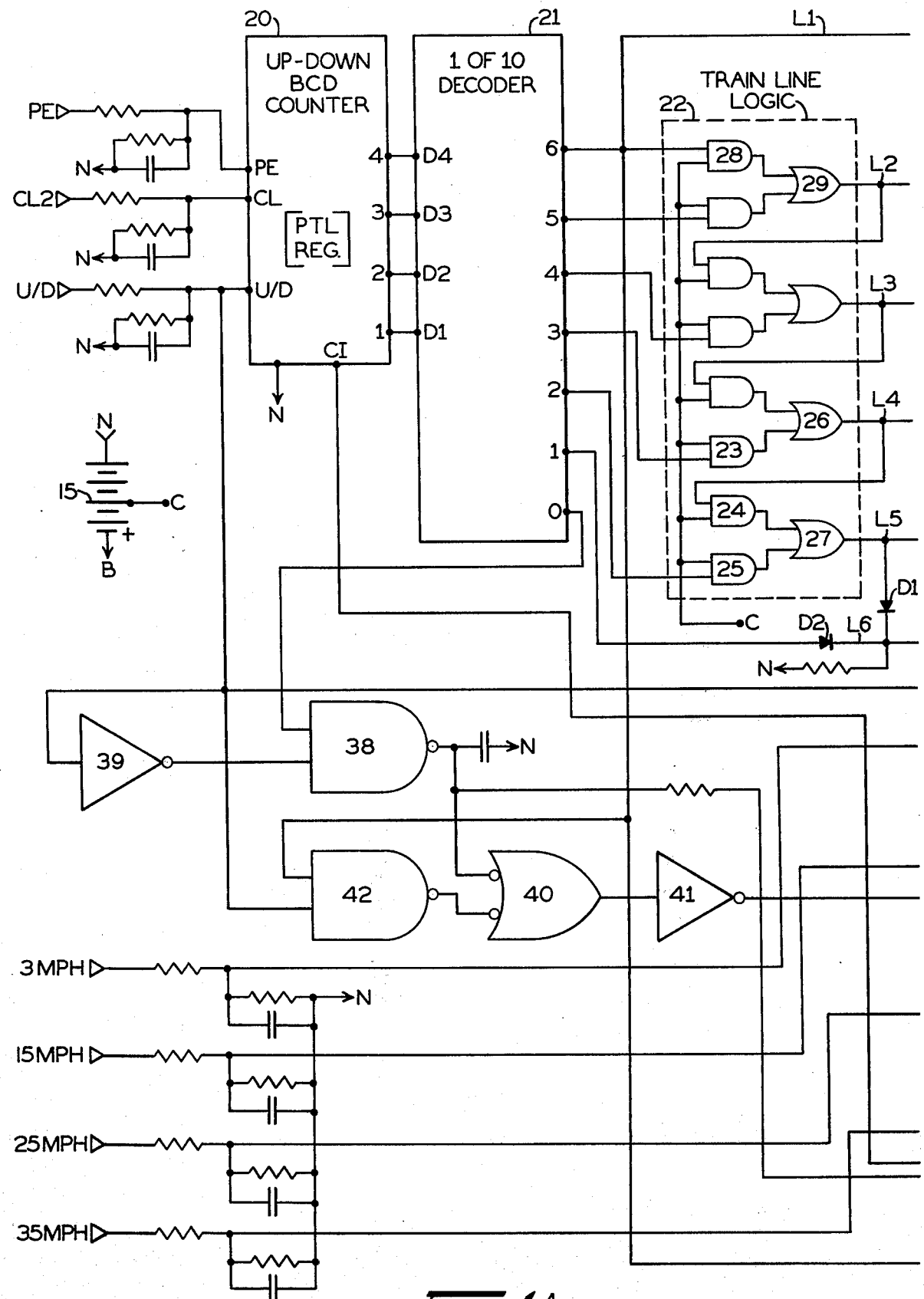
FIGS. 1A and 1B, when placed adjacent with FIG. 1B to the right, are a schematic logic diagram of a propulsion train line encoder apparatus embodying the invention.

Conventional symbols are used in the drawings to designate AND, NOR, and amplifier/inverter logic circuit elements and transistors. The function and/or the nature of other portions of the logic circuitry represented by the larger blocks are designated by titles within the block. Preferably, the logic elements are of the integrated circuit type but individual solid state components may be used if preferred. The input and output terminals of the PTL apparatus are shown by small open triangles pointing inward or outward as they represent input or output signals, respectively. A local source of direct current operating energy is illustrated by the battery 15, shown at the left of FIG. 1A, having a positive terminal B, a negative terminal N, and a center tap terminal C. Where these specific references occur elsewhere in the drawing, they designate a connection to that specific terminal of the direct current source. Other types of direct current source providing regulated output voltages may of course be used. It is to be noted that the battery 15 is a common direct current source for all control apparatus carried on the train such as, for example, in the Station Stop and Speed Regulation System for Trains disclosed in the copending application of Reed H. Grundy, Ser. No. 581,369, filed the same date as the present case and having the same assignee, which includes the ATL apparatus of the previously mentioned application Ser. No. 581,370.

SPECIFIC DESCRIPTION OF THE ILLUSTRATED EMBODIMENT

Figure 1B:
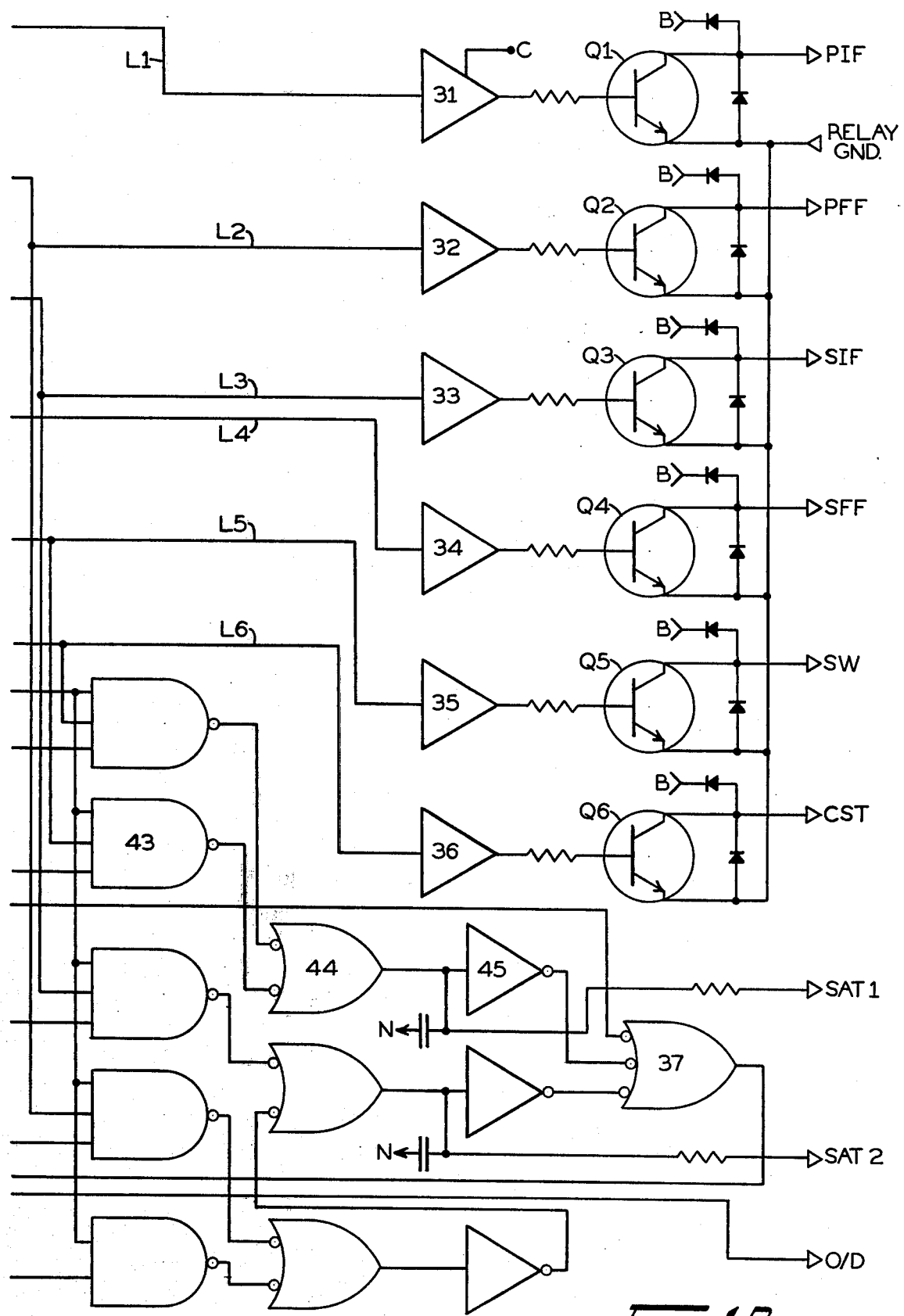

We shall now describe the operation of the propulsion train line (PTL) encoder apparatus illustrated in FIGS. 1A and 1B, when placed adjacent in the manner previously directed. Periodic clock pulses from an associated advance train line (ATL) apparatus, such as disclosed in the previously cited copending application Ser. No. 581,370, are received over input terminal CL2 in the upper left of FIG. 1A. They are applied to the clock terminal CL of the counter or register (PTL REG) unit 20. This counter unit is of the reversible type, i.e., counts up or down in accordance with the up/down signal received over input terminal U/D from an associated Velocity Brake Error apparatus such as disclosed in the above cited copending application Ser. No. 581,369. In other words, as the U/D signal has a high or low value, counter 20 adds to or subtracts from the existing count as each clock pulse CL2 is received from the ATL apparatus. The total count existing in unit 20 at any time appears in binary coded decimal (BCD) form at unit output terminals 1 to 4. Since counter/registry units such as 20 are well known and readily available in integrated circuit form, the details are not herein shown or described.

The BCD output from counter 20 is supplied to input terminals D1 through D4 of a one of ten decoder unit 21. The decoder unit operates to translate from the input BCD code to a decimal output. Unit 21 need have only one output terminal for each propulsion level state plus a zero output; thus, there are seven output terminals which are designated 0 through 6 in succession. The decimal output from unit 21 is connected to a Train Line Logic arrangement which comprises the AND/NOR circuit elements enclosed in the dash line block 22. These elements are connected in a "select and/or" network to provide a stepped output such that each succeeding step retains all the previous lower steps energized. For example, if output terminal 3 of decoder 21 is active, the resulting high level signal is applied to one input of AND element 23 of the train line logic network. The other input of AND element 23 is connected to terminal C of the direct current source. The resulting high level signal output from unit 23 actuates a corresponding high level output from NOR circuit element 26 to output line L4. The feedback connection from this output connects to one input of AND element 24, a second input which is also connected to terminal C of the source. Again, the high level output from AND element 24 actuates a high level output from NOR unit 27 to output line L5. This high level signal is also transmitted through diode D1 to line circuit connection L6. The single output from NOR element 27 is the same as through an input to AND element 25 existed from output terminal 2 of decoder 21. It is also to be noted that diode D2 is so positioned as to prevent the application of the high level signal on line L6 in a sneak path back to output terminal 1 of decoder 21. Similar feedback connections are also utilized from lines L2 and L3 to hold energized the lower level output lines of the train line logic 22. When line connection L1 is energized direct from terminal 6 of decoder 21, line L2 is also energized through AND element 28 and NOR element 29, so that all lower value lines are also energized. Both decoder 21 and the train logic network may be integrated circuit elements with the necessary outside feedback connections being made for the latter unit.

The output line circuits L1 through L6 from network 22 are each connected to a separate relay driver comprising a buffer amplifier and a transistor, for example, amplifier 31 and transistor Q1 associated with line L1. The amplifiers 32 through 36 and transistors Q2 through Q6 complete the bank of relay drivers. When actuated to a conducting condition, each transistor connects a corresponding output terminal to the relay grund (GND) terminal. Each output terminal is coupled to a train line conductor, either directly connected or through a repeater relay. In the previously mentioned copending application Ser. No. 581,369, the use of PTL relays is illustrated. When the transistor is conducting, it thus completes a connection for energizing the relay which in turn completes the circuit for applying energy to the corresponding propulsion train line. The reference characters for these output terminals represent the traction motor connections for various propulsion levels in accordance with the following tabulation:

CST - Coast condition with motors off
SW - Switch position
SFF - Series full field
SIF - Series intermediate field
PFF - Parallel full field
PIF - Parallel intermediate field Counter 20 is also provided with a clock inhibit terminal CI. When a high level signal is applied, the counting operation is inhibited. If an error or fault occurs so that CL2 pulses are continuous, it is necessary to halt counter 20 operation at either extreme counting condition, that is, zero or full count. The inhibit signal is then applied to terminal CI at a high level from the output of NOR element 37 shown in the lower right of FIG. 1B. When a zero count is reached under a count-down condition, that is, terminal U/D at low level, a high signal is applied from the 0 output terminal of decoder 21 to one input of AND circuit element 38. A second high level input to AND element 38 is received from input terminal U/D through inverter 39. The resulting inverted low output signal from AND element 38 is applied to one input of NOR element 40 and the resulting high output from this unit through inverter 41 is applied as a low input to the upper terminal of NOR element 37. The resulting high signal from unit 37 is applied to terminal CI of counter 21 and thus inhibits any further operation of this unit. The low signal output from unit 38 is also applied to a zero and down output terminal 0/D of this PTL apparatus. This terminal is connected to inhibit further operation of the associated ATL apparatus as described in the copending application Ser. No. 581,370 and enables a train braking effort, as disclosed in Ser. No. 581,369.

When counter 20 reaches a maximum count under count-up conditions, the resulting high level signal on onput terminal 6 of decoder 21 is applied to one input of AND circuit element 42. The high level signal existing on the U/D bus connections is applied to the other input of AND circuit 42. This results in a low level signal output which is applied to a second input terminal of NOR element 40. Through inverter 41, the high level output from NOR element 40 is again applied as a low level signal to NOR unit 37 and this results in a high level signal applied to terminal CI of the counter 20 to inhibit further operation of this latter unit.

The other inputs to NOR element 37 are concerned with inhibiting further up-counting by counter 20 whenever an intermediate speed command is in force. In many rapid transit systems, preselected limits for the propulsion effort are established and enforced when the allowed speed of the train is at a selected range less than the maximum speed limit. The allowed speed signals are obtained by a manual selection of the speed by an attendant or more desirably and usually by a cab signal or automatic speed control system as in the copending application Ser. No. 581,369. The speed signals are then matched against the output of the train line logic to develop an inhibit signal for the counter to halt further counting-up operation at preselected propulsion levels established to provide a desirable propulsion effort at each speed range. In the illustrated apparatus, this matching or comparison is accomplished by the logic network at the bottom of FIG. 1B, terminating in NOR element 37 which provides the inhibit signal input to counter 20. At the lower left of FIG. 1A, the input terminals for the allowed speed signals are illustrated. By way of example and for specific reference, each input terminal is designated by a specific speed selection which represents the maximum speed level under an existing speed control condition. In general terms, the specific speed levels are designated in ascending order as coasting, low, approach, and medium speeds, respectively. The high speed, i.e., the maximum speed under any conditions, is not involved in this limitation of the propulsion effort. It is to be understood, of course, that the specific speed limits shown associated with the input terminals are by way of example only and are not meant as a limiting design in the arrangement of our invention.

To illustrate this propulsion level limiting operation, we shall assume that a low speed command is in effect. Actually, an allowed medium speed range will exist but, since the associated ATL apparatus can increase the effective propulsion level one step over the PTL base level, the connections within this PTL apparatus must select a one speed lower limit. Therefore, a maximum level of 15 miles per hour is selected and the corresponding input terminal receives a high level signal which is applied to one of the inputs of AND element 43. Since the propulsion limiting action is only appropriate and required during an up-counting condition, the existence of the up count is assumed so that a high level signal is applied from the U/D input bus to the upper input terminal of element 43. When the advance in the propulsion levels reaches the condition in which logic unit 22 provides an output at the SW level on line L5, a high level signal is applied to the third input of AND element 43. Thus, the inverted output of AND element 43 goes to the low level which is transformed by the NOR element 44 into a high level output. This high level signal is inverted by inverter 45 into a low level signal applied to the center input of NOR 37. Thus, as in other cases, the output of element 37 then goes to a high level which is applied to terminal CI of counter 20 to inhibit further counting operation. This, of course, limits the propulsion level which can be obtained for low speed operation to the switching condition SW. The high level signal output from NOR circuit 44 is also supplied to an apparatus output terminal SAT 1. The high level signal at this output terminal indicates that the propulsion train line encoder apparatus has reached a saturated condition under the existing speed command and propulsion limit arrangement. This signal is applied to the advance train line apparatus to inhibit further propulsion advance by that apparatus in the car by car stepping arrangement as explained in the copending application Ser. No. 581,370.

Similar logic circuit paths exist for other speed selections and the corresponding propulsion limits. These may be traced by reference to the preceding description and by observation of the accompanying drawing. The coasting or three mile per hour maximum speed level is paired with the 15 mile per hour or low speed level for an indication of the saturated PTL condition on terminal SAT 1. Another channel designated as SAT 2 is provided for the two higher speed selections when the propulsion saturation condition occurs and also to inhibit the ATL apparatus for a maximum count condition, as may be observed from the drawings.

The arrangement of our invention thus provides a propulsion train line encoder and control arrangement usable in an automatic station stop and speed regulation system for trains. Clock pulses, signaling completion of each ATL cycle of car by car increase or decrease in the propulsion effort, are registered, counted, and the count decoded or converted into a decimal form. Through the feedback logic network and relay drivers, the PTL relays are sequentially energized to increase or decrease the propulsion level for the train. Our apparatus further provides protection against counting beyond the maximum upper limit or the zero limit in the event of a fault condition. It also provides for selectively limiting, as may be desired, the propulsion level obtainable for various speed limits. The arrangement accomplishes these various functions in an efficient and economical manner to provide reliable operation in the station stop and speed regulation system.

Although we have herein shown and described but a single form of propulsion train line encoder apparatus embodying our invention, it is to be understood that various changes and modifications therein within the scope of the appended claims may be made without departing from the spirit and scope of our invention.

Having now described the invention, what I claim as new and desire to secure by Letters Patent, is:

1. A propulsion train line encoder, for use in a speed regulation system for a train comprised of cars having individual propulsion apparatus operable to a plurality of levels of propulsion effort, said system including advance train line apparatus for varying the train propulsion effort in car by car steps from any base level, comprising in combination,
   a. a reversible binary counter means coupled for receiving a periodic clock pulse from the associated advance train line apparatus, when each cycle of car by car propulsion variation is completed, and a count direction signal from the speed regulation system having a first or a second condition in accordance with the direction of the existing error between actual and allowed train speeds,
   1. said counter means operable for counting said clock pulses, adding or subtracting each pulse from the existing digital count as said direction signal has a first or second condition, respectively,
   b. propulsion train line driver means responsive to a selective input signal for actuating the propulsion apparatus on each car to a selected level to establish a base propulsion effort for that train,
   c. conversion logic means connected for receiving the digital output count from said counter means and coupled to said train line driver means for supplying a converted signal individually selecting the base propulsion level corresponding to the existing count in said counter means,
   d. an inhibit logic network coupled to said conversion logic means, to said counter means, and to receive said direction signal, and responsive to an output signal from said conversion means representing either the maximum or minimum count limit for generating a signal to inhibit further counting operation when said counter means counts to either limit and the direction signal has a corresponding condition.

2. A propulsion train line encoder as defined in claim 1 in which said driver means includes,
   a. an individual driver element corresponding to each of said plurality of propulsion levels and connected to a train line circuit when activated for actuating each individual car propulsion apparatus to the designated base propulsion level, and
   b. an input circuit for each driver element coupled for receiving an activating signal from said conversion logic means when said counter means registers a count corresponding to the base propulsion level controlled by that driver element.

3. A propulsion train line encoder as defined in claim 2 in which said conversion logic means comprises,
   a. a decoder means coupled for receiving the digital binary output from said counter means and operable for converting the binary code digits into an equivalent decimal signal output, and
   b. a train line logic network, interconnected to have a select and/or characteristic, coupled for receiving said decimal output signals and connected for supplying activating signals to the input circuit of the individual driver element controlling the base propulsion level corresponding to the decimal count and to the input circuits of all lower level driver elements.

4. A propulsion train line encoder as defined in claim 1 which further includes,
   a. an allowed speed input means connected to said speed regulation system for supplying to said encoder a selected one of a plurality of signals each representing a different allowed speed range for the train,
   b. said speed input means connected to said inhibit logic network for selecting a different one of said plurality of base propulsion levels as the maximum propulsion effort for each of said allowed speed ranges, c. said inhibit network responsive to the received speed signal and to the existing converted signal from said conversion means for inhibiting further counting by said counter means when the selected base propulsion level is achieved.

5. A propulsion train encoder as defined in claim 3 which further includes,
   a. an allowed speed input network coupled to said speed regulation system for supplying a selected one of a plurality of signals each representing a different allowed speed range for the train, and in which said inhibit logic network comprises,
   b. a count limit detection network coupled to said decoder means and to receive said count direction signal and responsive for generating a count limit output signal when a maximum or minimum count limit is reached by said counter means under a corresponding direction signal,
   c. a propulsion limit selector network connected to said allowed speed input network and to said train line logic network in a manner for selecting a base propulsion level maximum limit for each allowed speed range,
      1. said limit selector network responsive to an allowed speed input signal and an activating signal on said input circuits of said individual driver elements for supplying a propulsion limit output signal when corresponding speed and activating signals are simultaneously detected,
   d. an output element coupled to receive said count limit output signal and said propulsion limit output signal and responsive to the reception of either signal for generating an inhibit signal to inhibit further counting by said counter means.

* * * * *